(No Model.) 3 Sheets—Sheet 3.
G. LANGER.
MOTOR VEHICLE.
No. 589,001. Patented Aug. 31, 1897.
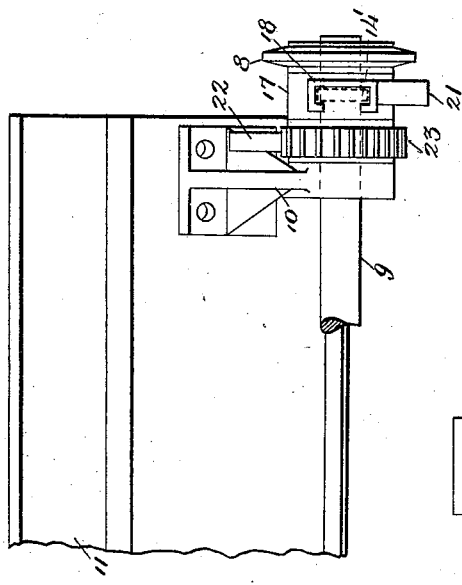
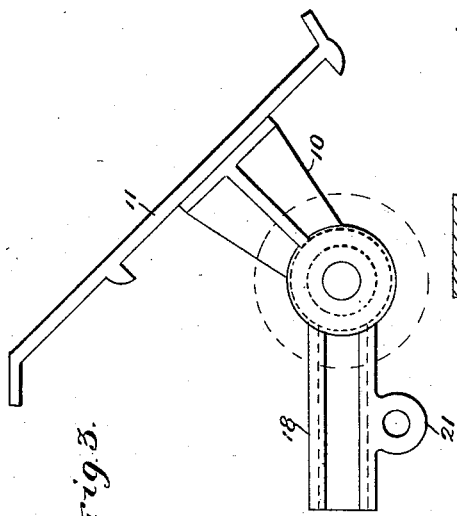
Witnesses
Alfred A. Mathey
Chris Balleh
Inventor
Gotthold Langer.
By his Attorneys
Keller & Staver

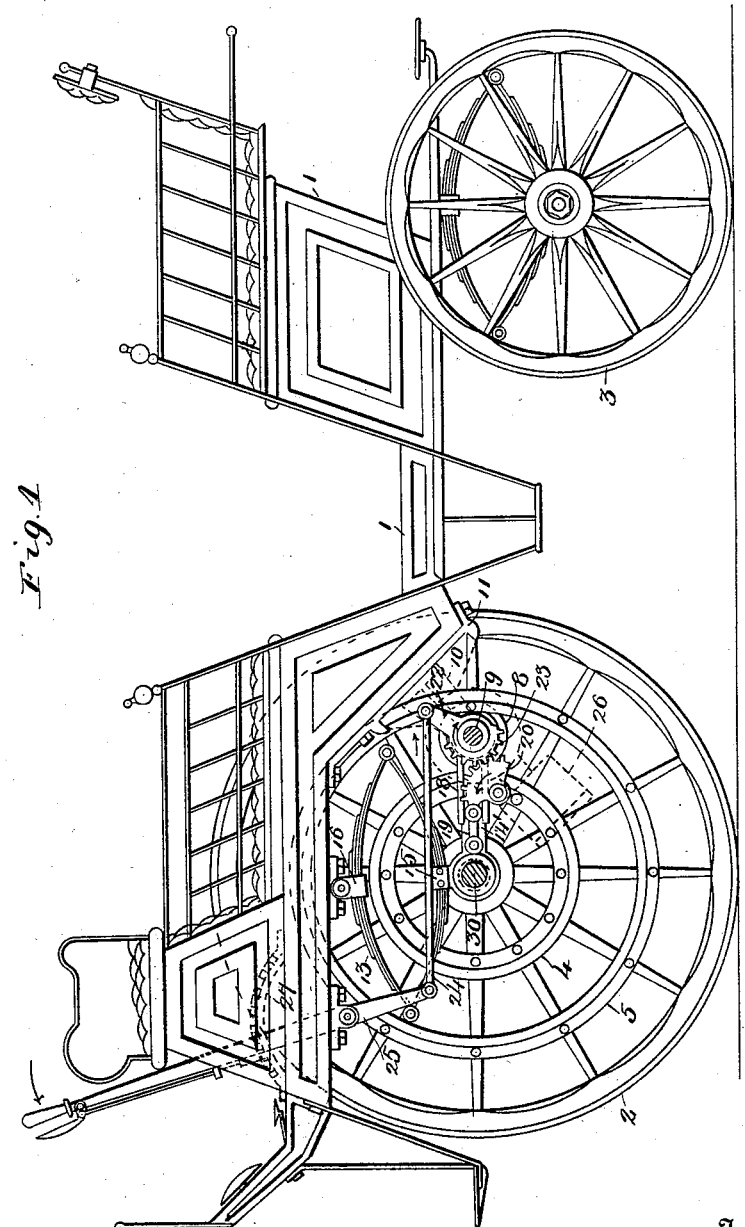

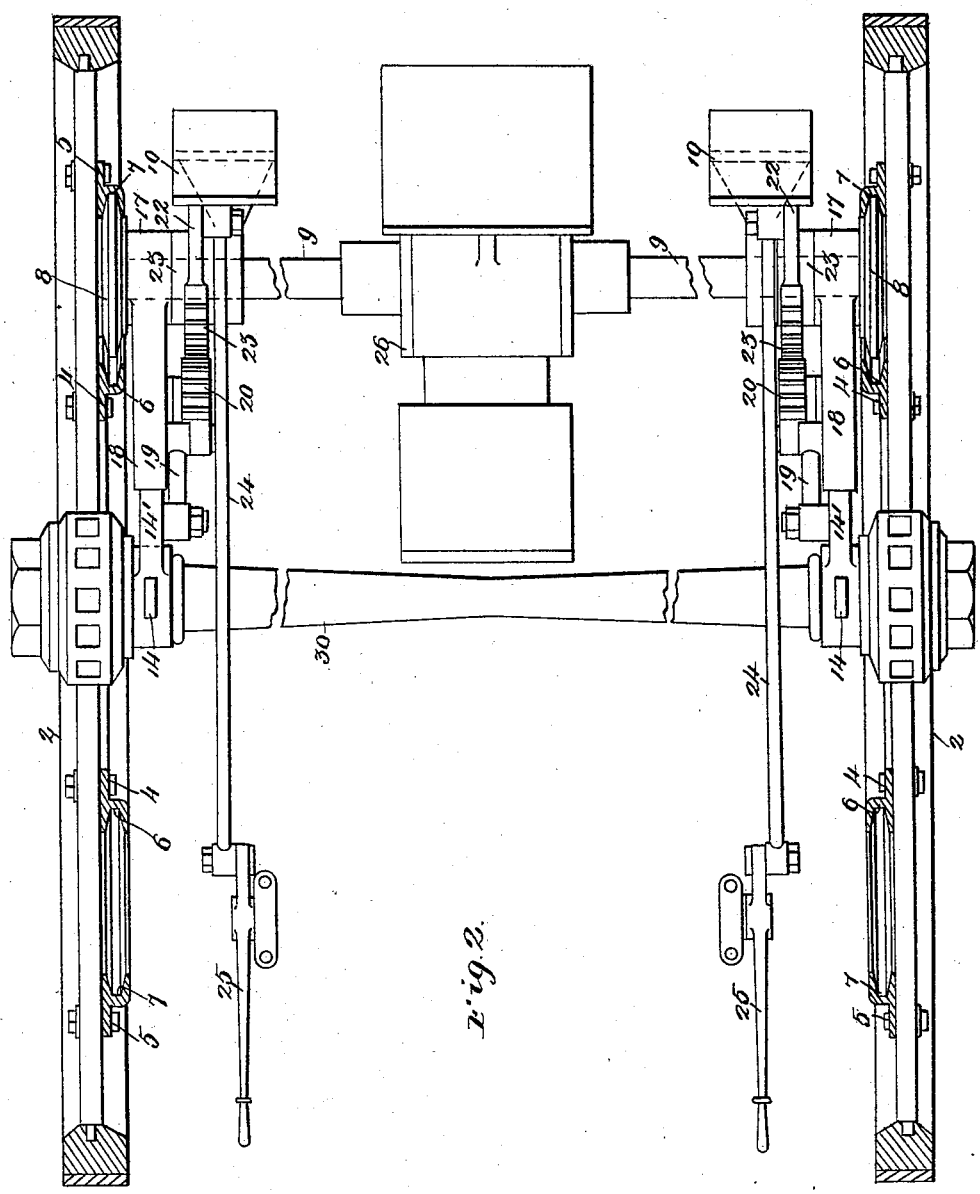

UNITED STATES PATENT OFFICE.

GOTTHOLD LANGER, OF ST. LOUIS, MISSOURI, ASSIGNOR OF THREE-FOURTHS TO CHARLES J. RAUCH, OF MEMPHIS, TENNESSEE, JOHN SCHMELZER, OF CENTRALIA, ILLINOIS, AND JOSEPH B. NIERMANN, OF ST. LOUIS, MISSOURI.

MOTOR-VEHICLE.

SPECIFICATION forming part of Letters Patent No. 589,001, dated August 31, 1897.

Application filed August 31, 1896. Serial No. 604,487. (No model.)

*To all whom it may concern:*

Be it known that I, GOTTHOLD LANGER, a citizen of the United States, residing at St. Louis, in the State of Missouri, have invented certain new and useful Improvements in Motor-Vehicles, of which the following is a full, clear, and exact description, reference being had to the accompanying drawings, forming a part hereof.

My invention has relation to improvements in motor-wagons or horseless vehicles; and it consists in the novel arrangement and combination of parts, more fully set forth in the specification, and pointed out in the claims.

In the drawings, Figure 1 is a side elevation of my improved vehicle with one of the front wheels removed. Fig. 2 is an enlarged bottom plan view of the forward portion of the vehicle with the driving-wheels in section. Fig. 3 is a detail of the bracket supporting the drive-shaft and channel guide-plate suspended therefrom. Fig. 4 is an elevation in detail of the parts supported by one of the brackets shown in Fig. 3. Fig. 5 is a detail showing in section one of the supporting-brackets for the drive-shaft and the parts carried by said brackets; and Fig. 6 is a side elevation of the sliding bar embracing the axle of the front truck, the axle being shown in section.

The object of my invention is to construct a motor-wagon or horseless vehicle in which the driving mechanism is materially simplified over existing forms, wherein the number of parts constituting such driving mechanism are reduced to a minimum, wherein the direction of travel of the vehicle is under perfect control of the operator, wherein both the steering of the apparatus and the direction of travel thereof are accomplished directly by the propelling mechanism and parts coöperating therewith, wherein there is an absence of any specific brake mechanism, the stopping being accomplished directly from the driving mechanism, and wherein further and other advantages are presented, as will more fully hereinafter appear from the detailed description of the vehicle, which is as follows:

Referring to the drawings, 1 represents a suitable carriage-body, 2 the front or driving wheels thereof, and 3 the hind wheels. Carried by or forming a part of each wheel 2, and disposed along the inner face thereof, are the concentric channel-rings 4 5, the ring 4 being provided with an exterior peripheral bevel channel or groove 6, and the ring 5 being provided with an inner peripheral similar groove 7. Adapted to alternately mesh with the inclined walls of the grooves or channels of said rings 4 and 5 is a driving-disk 8, having a beveled periphery or edge to conform to the inclined walls of the groove in which it is adapted to operate. The driving-disks 8 are carried by the opposite ends of the main drive-shaft 9, having bearings in the ends of the brackets 10, formed integrally with the plates 11, secured to the wagon-body, the shaft being directly supported in the hollow tubular extensions 12, forming the lateral terminal extensions of the brackets. The lower bow or member of the front supporting-spring 13 rests on a lug 14, forming a part of the base or loop of a sliding bar 14', the loop of said bar loosely embracing the axle 30 of the front wheels 2. A clip 15, embracing the spring, secures the latter to the lug on which it rests, the ends of the embracing-clip being fastened directly to the sides of the lug, thereby effecting a longitudinal rocking connection between the spring and axle of the front truck.

The upper member or bow of the supporting-spring 13 is yieldingly connected to the wagon-body by a clip 16. By this arrangement the front end of the wagon-body becomes movably connected to the axle of the front truck, thus enabling the driver to relatively shift (to a slight degree) the front truck backward or forward with respect to the rear truck, of which the wheels 3 form a part.

Loosely embracing each tubular extension 12 is the terminal loop 17 of a channel guide-plate 18, the channel of said plate being adapted to receive and guide the adjacent end of the sliding bar 14' above referred to. A suitable link 19, having one end pivotally secured to the bar 14' exterior to the free end of the guide-plate 18, connects said sliding bar 14' with the oscillating end of a toothed quadrant 20, pivoted to a lug 21, carried by the lower edge of the said guide-plate 18.

The teeth of the quadrant 20 mesh with the peripheral teeth of the basal loop 23 of an arm 22, by which the tubular extension 12 of the supporting-bracket 10 is loosely embraced. The toothed loop 23 of said arm thus embracing the extension 12 is interposed between the bracket 10 and the loop 17 of the guide-plate 18, the free end of the arm 22 being connected by a connecting-rod 24 to the short arm of a controlling-lever 25, pivoted on each side of the driver's seat. The drive-shaft 9 is rotated by any suitable gasolene or similar motor 26, secured to the body of the vehicle, on the under side thereof.

The operation is as follows: The motor-shaft 9, with its terminal friction-disks 8, rotates in but one direction during the travel of the vehicle. From the yielding connection existing between the forward end of the wagon-body and the front truck, by which the front truck can be to a degree shifted to and from the rear truck, as already indicated, it is apparent that when the driver tilts the controlling-levers 25 in the direction shown by the arrows in Fig. 1 the arms 22 will rock about the tubular extensions 12 in the direction indicated, thus oscillating the toothed quadrants 20 in the direction shown, the latter by their link connections with the sliding bars 14' pushing the latter in a direction to force the forward truck outwardly, thereby drawing the outer ring 5, carried by the wheels of said truck, into engagement with the rotating friction-disks 8 and impelling the wheels 2 in one direction. By reversing the motion of the levers 25 the several parts would operate in the reverse direction, thereby drawing the front truck inwardly and bringing the rotating disks 8 into engagement with the peripheral groove of the inner ring 4, causing the wheels 2 to be impelled in the reverse direction. By tilting the levers 25 to an intermediate position, where neither ring 4 nor 5 will be engaged by the disks 8, the vehicle will come to a standstill.

By tilting the levers independently in opposite directions one wheel 2 may be made to revolve in one direction and the other in the reverse direction, or one wheel may be allowed to remain stationary while the other is revolving in one direction, thus steering the vehicle in any direction desired. Again, if both levers 25, after having once been made to drive either one of the rings 4 5, are simultaneously and suddenly reversed, so as to suddenly bring the driving-disks 8 into engagement with the opposite ring 5 or 4, the vehicle will suddenly come to a stop by reason of the tendency of the disks to drive the wheels 2 in a reverse direction. The tendency to thus reverse the direction of motion of the driving-wheels 2 acts as a brake for the vehicle.

By making the grooves of the rings 4 5 beveled and the driving-disks beveled on the periphery a more gradual contact is effected between these parts, thereby starting the vehicle gradually and without any sudden jerks.

The controlling-levers, after being once tilted to the proper position, may be temporarily locked in said position along the toothed arcs or plates 27, carried on each side of the driver's seat.

In order to prevent undue strain on the axle of the front wheels or truck when occasion arises to turn the vehicle—that is, when the controlling-levers 25 are tilted by the driver in opposite directions for the purpose of bringing into engagement the driving-disk at one end of the motor-shaft with the inner channel-ring of the wheel on one side and that at the opposite end with the outer channel-ring of the wheel on the opposite side—I provide sufficient play between the axle and the walls of the opening of the looped end of the sliding bar 14' by making such opening large enough (see Fig. 6) to permit the axle to freely respond to the pulls exerted by the driver in opposite directions on the opposite ends of said axle.

The present construction offers an advantage in cases where the wagon passes over rough surfaces, such as rocks, stones, &c., interposed in its path, in that the compression of the supporting-springs 13 under those circumstances do not in any wise disturb the constancy of pressure of the friction-disk against its channel-ring. The reason of this is that the paths described respectively by the pivotal point of the toothed quadrant 20 and by the adjacent end of the axle of the front truck lie, respectively, along circles having a common center in the line of the axis of the motor-shaft, whereby the parts always retain the same relative position whatever may be the degree of compression or expansion of the said supporting-springs 13.

Having described my invention, what I claim is—

1. In a motor-vehicle, a suitable wagon-body, wheels for the same, a motor carried by the vehicle, a drive-shaft for said motor adapted to be rotated in one direction during the travel of the vehicle, the axes of rotation of the wheels being movable relatively to the motor-shaft, mechanism for effecting engagement between the motor-shaft and wheels for turning the latter in either direction, and means under the control of the operator for shifting the position of the wheels relatively to said shaft whereby the direction of rotation of the wheels in one direction or the other is determined, substantially as set forth.

2. In a motor-vehicle, a suitable wagon-body, wheels for the same, a motor carried by the vehicle, a drive-shaft for said motor, a friction-disk carried by or connected with the motor-shaft, suitable concentric rings or engaging surfaces forming a part of or carried by each wheel for engaging with the friction-disk and turning said wheels, the axes of rotation of the wheels being movable relatively to the motor-shaft, and means under the control of the operater for shifting the wheels relatively to said shaft whereby the direction of rotation of the wheels in one direction or the other is determined while the motor-shaft is rotating in one and the same direction, substantially as set forth.

3. In a motor-vehicle, a wagon-body, a front and rear truck for the same, a yielding connection between the front truck and the wagon-body whereby the front truck may be shifted toward or from the rear truck, a motor carried by the wagon-body, a shaft for the motor, bevel friction-disks actuated by the shaft, concentric channel-rings carried by the wheels of the front truck, and intermediate connections between the wagon-body and front truck for shifting the latter to or from the rear truck and bringing the channel-rings alternately into coöperation with the driving-disks, substantially as set forth.

4. In a motor-vehicle, a wagon-body, a front truck for the same, a yielding spring connection between the truck and wagon-body, a motor carried by the wagon-body, a shaft for the motor, driving-disks carried by the shaft, concentric channel-rings carried by the wheels of the truck, brackets having terminal tubular extensions for the support of the opposite ends of the motor-shaft, a channel guide-plate loosely embracing each tubular extension of the bracket, a toothed quadrant pivoted to said channel guide-plate, an arm having a toothed loop loosely embracing each tubular extension of the brackets and located adjacent to the channel guide-plate, the teeth of the loop of the arm meshing with the teeth of the quadrant, a sliding bar having one end guided within the channel of the guide-plate, and the opposite end loosely embracing the axle of the truck, a link connection between the sliding bar and the oscillating end of the quadrant, and a controlling-lever connected to each toothed arm, whereby the wheels of the truck and the channel-rings carried by them can be brought into engagement with the rotating drive-shaft, substantially as set forth.

In testimony whereof I affix my signature in presence of two witnesses.

GOTTHOLD LANGER.

Witnesses:
  ALFRED A. MATHEY,
  EMIL STAREK.